(12) United States Patent
Torizawa (10) Patent No.: US 6,978,859 B2
(45) Date of Patent: Dec. 27, 2005

(54) POWER STEERING SYSTEM (75) Inventor: Yuji Torizawa, Kanagawa (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/942,125

(22) Filed: Sep. 16, 2004

(65) Prior Publication Data
US 2005/0061574 A1    Mar. 24, 2005

(30) Foreign Application Priority Data

Sep. 18, 2003  (JP)  ............................. 2003-326702
Sep. 18, 2003  (JP)  ............................. 2003-326703

(51) Int. Cl.[7] .............................................. B62D 5/06
(52) U.S. Cl. ..................................... 180/405; 180/421
(58) Field of Search ............................... 180/405, 417, 180/421, 422, 423

(56) References Cited

U.S. PATENT DOCUMENTS 4,771,749 A  *  9/1988  Kiuchi et al. .......... 123/339.21
4,787,469 A  *  11/1988 Yoshida et al. ............. 180/422
2004/0238261 A1 * 12/2004 Kodama et al. ............ 180/443

FOREIGN PATENT DOCUMENTS

JP  2002-145087  5/2002

* cited by examiner

Primary Examiner—Kevin Hurley
(74) Attorney, Agent, or Firm—Sughrue Mion, PLLC

(57) ABSTRACT

A power steering system includes a reversible pump for supplying hydraulic fluid to pressure chambers of a power cylinder through first and second passages, an assisting-force detector for detecting a steering assisting force to be provided to a steering wheel, a motor control circuit outputting a drive signal to an electric motor in accordance with the detected steering assisting force so as to obtain a desired hydraulic pressure, a communication passage for providing fluid communication between the first and second passages, a solenoid valve for switching between communication and interruption of the communication passage, and a current detector for detecting a current passing through an energization circuit of the solenoid valve and between the solenoid valve and a ground.

10 Claims, 8 Drawing Sheets

POWER STEERING SYSTEM

BACKGROUND OF THE INVENTION

The present invention relates to a power steering system for assisting the steering by driving an oil pump through an electric motor.

With a typical power steering system, an oil pump is driven by an electric motor rotated in accordance with output of a torque sensor for sensing a steering torque, increasing the hydraulic pressure within one of the power-cylinder chambers separated by a piston, thus assisting the steering. The pressure difference occurs between the chambers by the steering made by the driver. With the pressure difference being greater, when the pump stops due to its anomaly and the like, the steering is locked.

In order to cope with such inconvenience, an electric hydraulic power steering system is proposed comprising a bypass circuit for providing fluid communication between the chambers and a fail-safe solenoid valve for switching between the communication state and the non-communication state of the bypass circuit. With this power steering system, when some anomaly occurs, the solenoid valve is switched to the communication state, canceling the pressure difference between the chambers, thus allowing non-assisted steering (refer hereafter to as "manual steering") wherein a steering force is produced by the driver only.

SUMMARY OF THE INVENTION

With the electric hydraulic power steering system, however, a failure of the solenoid valve cannot be detected due to no monitoring of the operating condition thereof.

It is, therefore, an object of the present invention to provide a power steering system which allows sure detection of a failure of a fail-safe solenoid valve.

The present invention provides generally a power steering system, which comprises: a hydraulic power cylinder which assists a steering force of a steering mechanism coupled to a steering wheel; a reversible pump which supplies a hydraulic fluid to pressure chambers of the power cylinder through first and second passages; an electric motor which rotates the pump in first and second directions; an assisting-force detector which detects a steering assisting force to be provided to the steering wheel; a motor control circuit which outputs a drive signal to the motor in accordance with the detected steering assisting force so as to obtain a desired hydraulic pressure; a communication passage which provides fluid communication between the first and second passages; a solenoid valve which switches between communication and interruption of the communication passage; and a current detector which detects a current passing through an energization circuit of the solenoid valve and between the solenoid valve and a ground.

BRIEF DESCRIPTION OF THE DRAWINGS

The other objects and features of the present invention will become apparent from the following description with reference to the accompanying drawings, wherein.

DETAILED DESCRIPTION OF THE INVENTION

Referring to the drawings wherein like references designate like parts throughout the views, a power steering system according to the present invention will be described in connection with the preferred embodiments.

Figure 1:
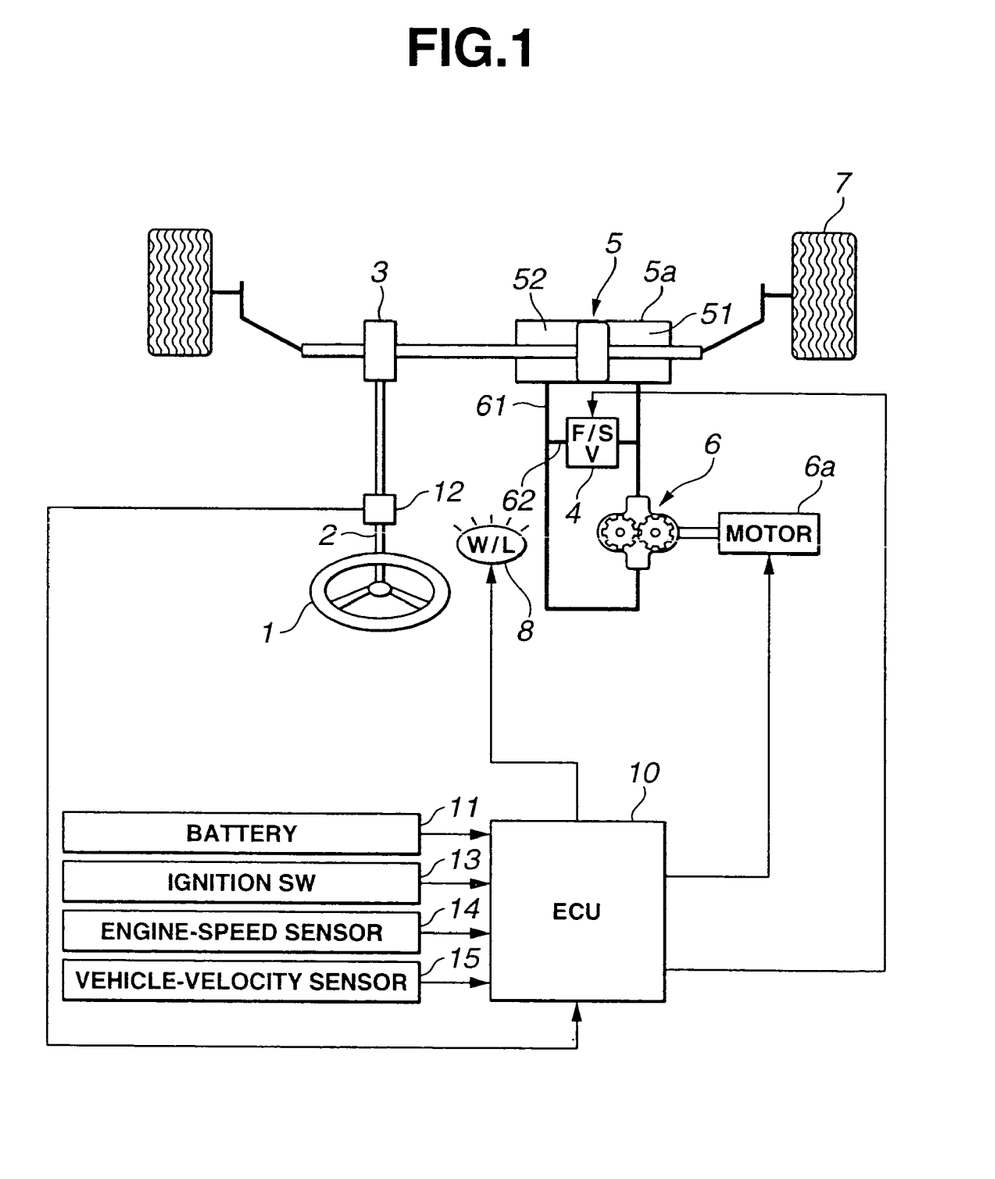
FIG. 1 is a schematic diagram showing a general structure of a power steering system embodying the present invention.

Referring to FIGS. 1–7, there is shown first embodiment of the present invention. Referring to FIG. 1, the power steering system comprises a steering wheel 1, a steering shaft 2, a rack-and-pinion gear mechanism 3, a power steering mechanism 5 for assisting a steering force produced by the driver, an external-gear reversible oil pump 6 driven by an electric motor 6a, steered wheels 7, a warning lamp 8 for announcing occurrence of a failure of the steering system to the driver, and a steering electronic control unit (ECU) 10.

Oil pump 6 serving as a hydraulic source of power steering mechanism 5 is provided to a hydraulic line 61 for providing fluid communication between first and second chambers 51, 52 of a power cylinder 5a. When the driver operates steering wheel 1, the direction of rotation of electric motor 6a is switched in accordance with the direction of operation of steering wheel 1 to supply or discharge hydraulic oil between first and second chambers 51, 52, assisting a driver's steering force. Specifically, when steering wheel 1 is turned to the right as viewed in FIG. 1, electric motor 6a is driven in the direction of supplying hydraulic oil from second chamber 52 to first chamber 51, thus assisting a driver's steering force.

A bypass circuit 62 is provided to hydraulic line 61 so as to provide fluid communication between first and second chambers 51, 52 without passing through oil pump 6. Provided on bypass circuit 62 is an electronic controlled solenoid valve 4 which is operated in accordance with a command signal of ECU 10.

Solenoid valve 4 includes a normally open valve which is closed when applying a voltage in accordance with a command signal of ECU 10, and is open when applying no voltage. With this, even if some anomaly occurs to the steering system to interrupt power, first and second chambers 51, 52 can be in fluid communication, allowing the driver to carry out ordinary steering or manual steering with no assisting torque provided.

A torque sensor 12 is mounted to steering shaft 2 so as to sense a steering torque produced by the driver.

ECU 10 inputs a steering-torque signal of torque sensor 12, an ignition signal of an ignition switch 13, an engine-speed signal of an engine-speed sensor 14, and a vehicle-velocity signal of a vehicle-velocity sensor 15. In accordance with the input signals, ECU 10 outputs command signals to electric motor 6a of oil pump 6, solenoid valve 4, and warning lamp 8.

Figure 2:
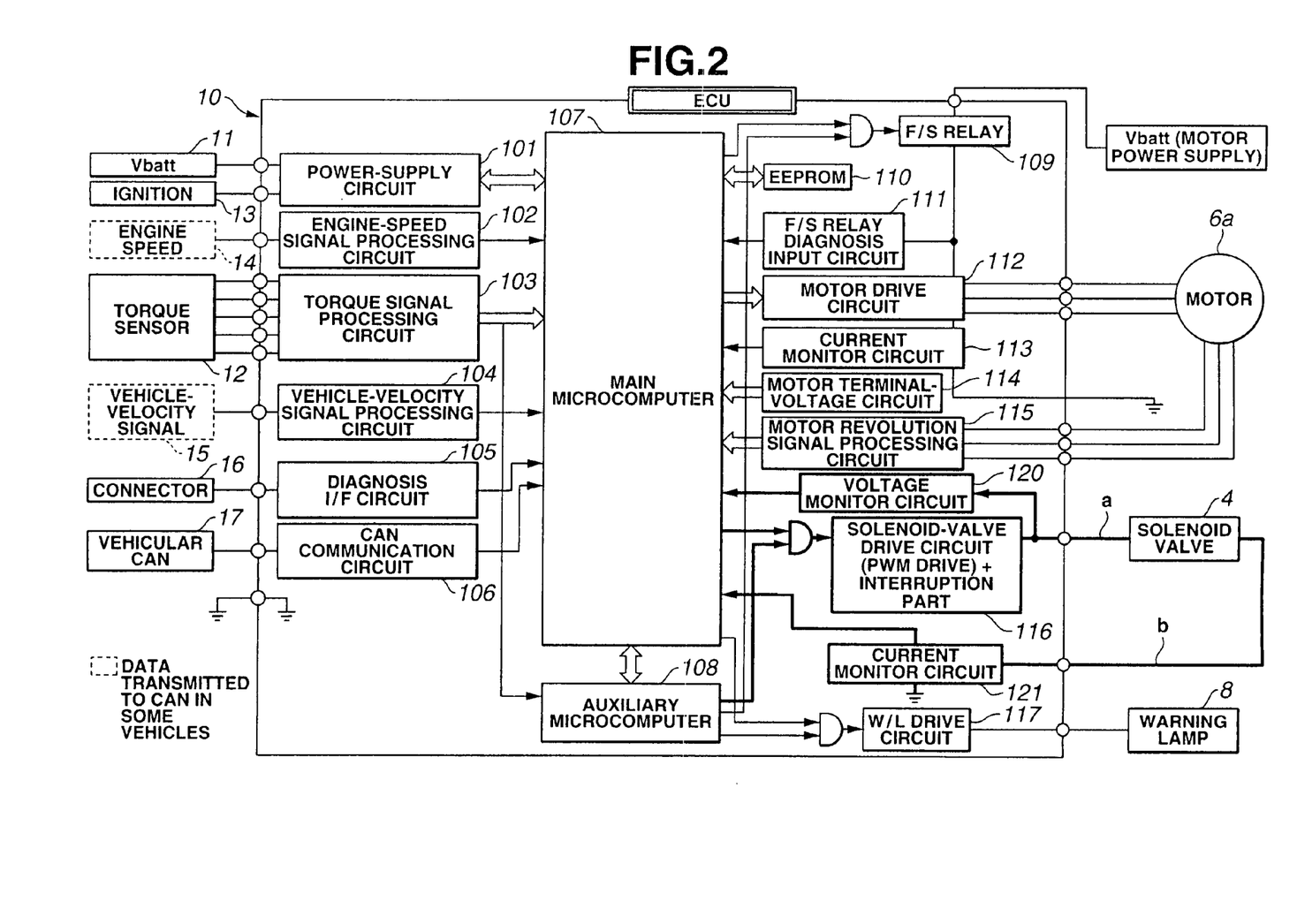
FIG. 2 is a block diagram showing a first embodiment of the present invention.

FIG. 2 shows a control circuit in ECU 10. The control circuit includes a power-supply circuit which inputs a voltage signal of a battery 11 and an ignition signal of ignition switch 13 to transmit/receive signals to/from a main microcomputer 107.

An engine-speed signal processing circuit 102 inputs an engine-speed signal of engine-speed sensor 14 to output it to main microcomputer 107. A torque signal processing circuit 103 inputs a torque signal of torque sensor 12 to output it to main microcomputer 107 and an auxiliary microcomputer 108. A vehicle-velocity signal processing circuit 104 inputs a vehicle-velocity signal of vehicle-velocity sensor 15 to output it to main microcomputer 107. A diagnosis interface circuit 105 inputs a diagnosis signal through a connector 16 to output it to main microcomputer 107. A CAN communication circuit 106 inputs a signal derived from a vehicular CAN 17 to output it to main microcomputer 107.

Auxiliary microcomputer 108 serves to monitor main microcomputer 107. Specifically, when main microcomputer 107 fails, auxiliary microcomputer 108 outputs control signals to a fail-safe relay 109, a solenoid-valve drive circuit including a first relay 116, and a warning-lamp drive circuit 117.

Fail-safe relay 109 interrupts power for driving electric motor 6a when some failure occurs. An EEPROM 110 stores and updates various data required for control. A fail-safe relay diagnosis input circuit 111 inputs an operation diagnosis signal of fail-safe relay 109 to output it to main microcomputer 107. A motor drive circuit 112 applies a voltage to electric motor 6a in accordance with a command signal of main microcomputer 107. A current monitor circuit 113 detects a current value of electric motor 6a to output it to main microcomputer 107. A motor terminal-voltage circuit 114 detects a terminal voltage of electric motor 6a to output it to main microcomputer 107. A motor revolution signal processing circuit 115 detects a revolution speed of electric motor 6a to output it to main microcomputer 107.

Solenoid-valve drive circuit 116 comprises a semiconductor relay, and outputs a drive signal to solenoid valve 4 in accordance with a command signal of main microcomputer 107 and auxiliary microcomputer 108. Warning-lamp drive circuit 117 outputs a drive signal to warning lamp 8 in accordance with a command signal of main microcomputer 107 and auxiliary microcomputer 108.

In the illustrative embodiment, since solenoid-valve drive circuit 116 comprises a semiconductor relay having high switching speed, solenoid valve 4 can be used for other purposes than fail-safe. By way of example, solenoid valve 4 is applicable to control at driver's quick switching of the steering, wherein a desired communication amount is secured through PWM control and the like to speedily cancel the pressure difference between first and second chambers 51, 52.

A voltage monitor circuit 120 is arranged between solenoid-valve drive circuit 116 and solenoid valve 4 (energization circuit or line "a") to detect a voltage applied therebetween. A voltage value detected by voltage monitor circuit 120 is output to main microcomputer 107. Moreover, a current monitor circuit 121 is arranged between solenoid valve 4 and a ground (energization circuit or line "b") to detect a current passing therebetween. A current value detected by current monitor circuit 121 is output to main microcomputer 107.

Figure 3A:
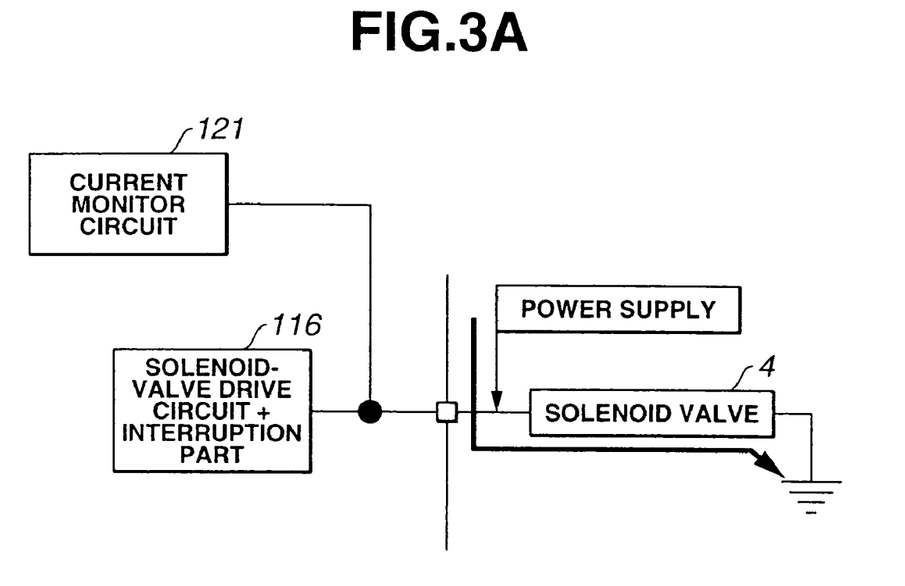
FIGS. 3A and 3B are schematic views showing a power-supply fault pattern and a ground fault pattern, respectively.
Figure 3B:
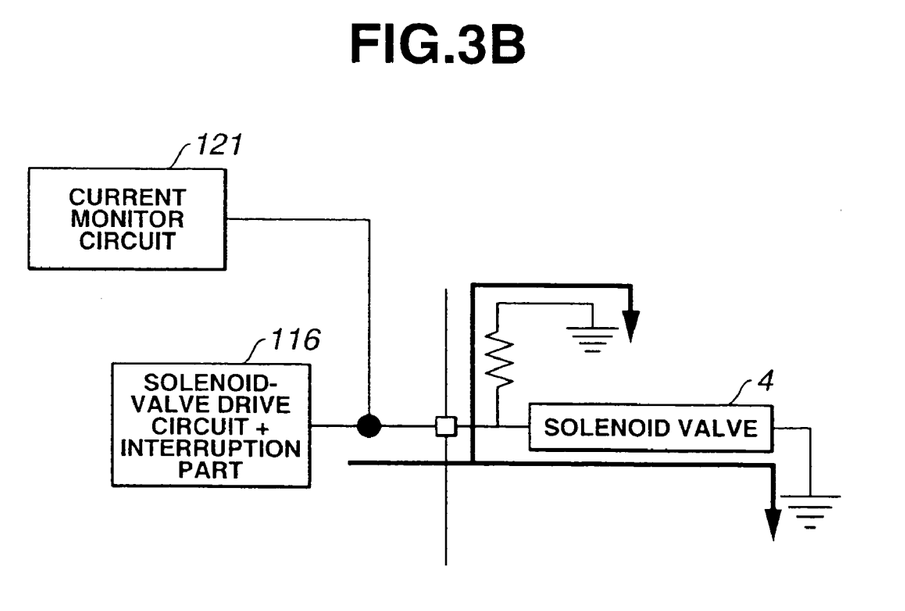

Referring to FIGS. 3A and 3B, the reason why current monitor circuit 121 is arranged between solenoid valve 4 and a ground will be described. FIGS. 3A and 3B show states that an undesired current is supplied to solenoid valve 4, respectively.

Referring to FIG. 3A, at occurrence of a power-supply fault, a current flows as indicated by arrow. Even when solenoid-valve drive circuit 116 is turned off to interrupt a current to solenoid valve 4, solenoid valve 4 can be supplied with a current from the power supply due to power-supply fault. Then, if the current monitor circuit is arranged between solenoid-valve drive circuit 116 and solenoid valve 4, the current monitor circuit has no current passing therethrough, leading to impossible detection of an anomaly.

Referring to FIG. 3B, at occurrence of a ground fault with resistance, a current flows as indicated by arrows. Even when solenoid-valve drive circuit 116 is turned on to supply a current to solenoid valve 4, solenoid valve 4 cannot be supplied with a desired value of current due to ground fault with resistance. Then, if a ground fault occurs between the current monitor circuit and solenoid valve 4, the current monitor circuit has a correct current passing therethrough, leading to impossible detection of an anomaly.

In view of the above points, current monitor circuit 121 is arranged between solenoid valve 4 and a ground. This arrangement allows detection of a current actually passing through solenoid valve 4 regardless of occurrence of a power-supply fault or a ground fault.

Figure 4:
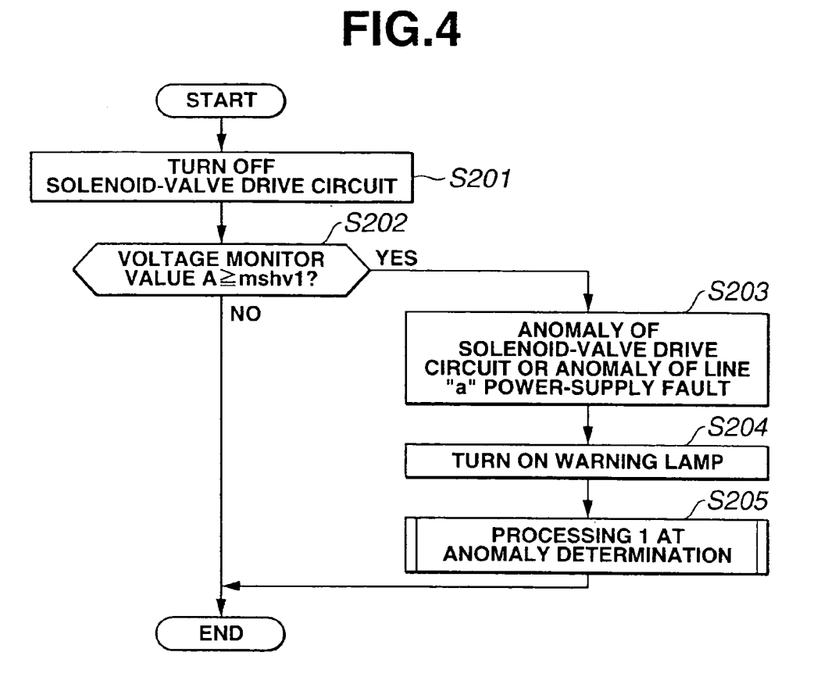
FIG. 4 is a flowchart showing operation of the first embodiment of the present invention.
Figure 5:
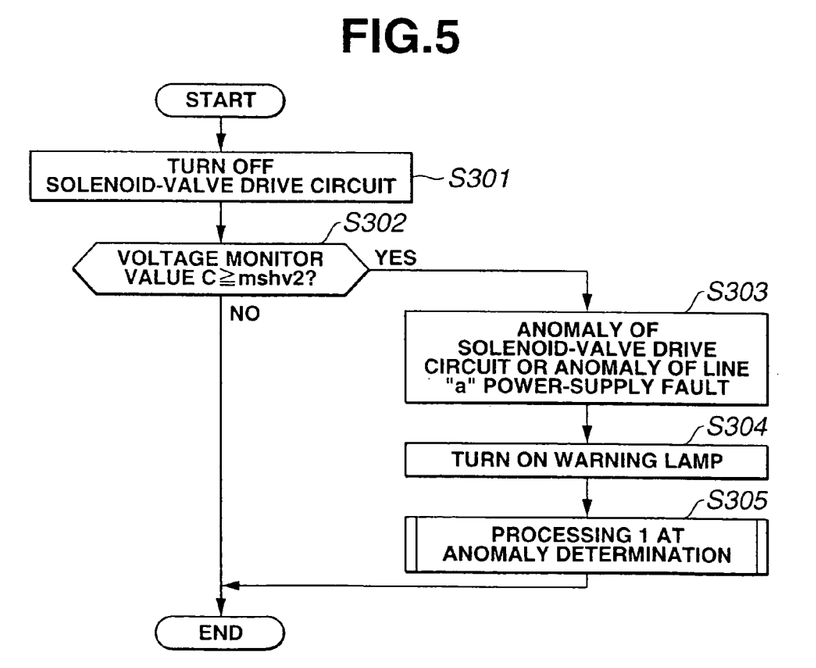
FIG. 5 is a chart similar to FIG. 4, showing operation of the first embodiment of the present invention.
Figure 6:
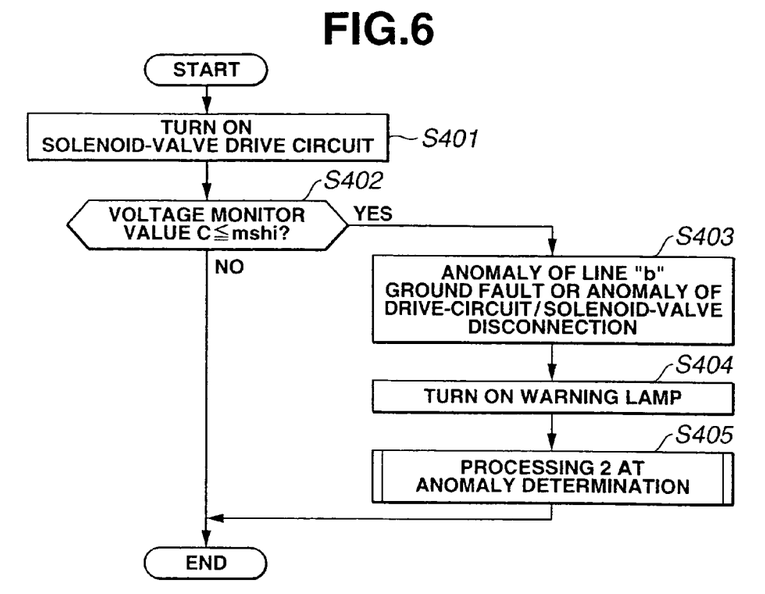
FIG. 6 is a chart similar to FIG. 5, showing operation of the first embodiment of the present invention.

Referring to FIGS. 4–6, processings 1–3 at circuit-anomaly determination will be described.

Referring to FIG. 4, circuit-anomaly determination processing I is carried out with voltage monitor circuit 120. At a step S201, solenoid-valve drive circuit 116 is turned off. At a step S202, it is determined whether or not a voltage monitor value A is equal to or greater than a predetermined value mshv1. If voltage monitor value A<mshv1, it is determined that no circuit anomaly occurs, and flow comes to an end. On the other hand, if voltage monitor value A≧mshv1, flow proceeds to a step S203 where it is determined that there occurs an anomaly of solenoid-valve drive circuit 116 or an anomaly of power-supply fault of energization circuit "a". This is because a voltage value is detected in spite of turn-off of solenoid-valve drive circuit 116. At a step S204, warning lamp 8 is turned on to announce occurrence of a failure to the driver. And at a step S205, processing 1 at anomaly determination is carried out.

Processing 1 at anomaly determination is processing to stop steering assisting control of the power steering system and interrupt energization to solenoid valve 4 and electric motor 6a. Note that when a voltage cannot surely be interrupted with solenoid-valve drive circuit 116 turned off, steering assisting control can continuously be carried out in some cases. Thus, depending on a kind of anomaly, alternative processing may be carried out in such a way as to reduce an assisting force as compared with during ordinary control and announce occurrence of an anomaly to the driver. Optionally, without carrying out processing 1 at anomaly determination, only occurrence of an anomaly may be announced to the driver by turn-on of warning lamp 8.

Referring to FIG. 5, circuit-anomaly determination processing II is carried out with current monitor circuit 121. The contents of processing II are substantially the same as those of processing I except control at a step S302 where it is determined whether or not a current monitor value C is equal to or greater than a predetermined value mshv2.

Referring to FIG. 6, circuit-anomaly (particularly, disconnection or ground fault) determination processing III is carried out with current monitor circuit 121. At a step S401, solenoid-valve drive circuit 116 is turned on. At a step S402, it is determined whether or not a current monitor value C is smaller than or equal to a predetermined value mshi. If current monitor value C>mshi, flow comes to an end. On the other hand, if current monitor value C≦mshi, flow proceeds to a step S403 where it is determined that there occurs an anomaly of ground fault of energization circuit "b" or an anomaly of disconnection of solenoid-valve drive circuit 116 or solenoid valve 4. This is because, with a predetermined value of current supplied from solenoid-valve drive circuit 116, when detecting a current value considerably smaller than the predetermined value, it can be determined that there occurs a disconnection of energization circuit "b" or a ground fault with resistance. At a step S404, warning lamp 8 is turned on to announce occurrence of an anomaly to the driver. And at a step S405, processing 2 at anomaly determination is carried out.

Processing 2 at anomaly determination is processing to stop steering assisting control of the power steering system due to its impossible continuation at occurrence of a disconnection and interrupt energization to solenoid valve 4 and electric motor 6a. Note that at occurrence of a ground fault, steering assisting control can continuously be carried out in some cases wherein a current value is lower than that during ordinary control, but can ensure operation of solenoid valve 4. Thus, depending on a kind of anomaly, alternative processing may be carried out in such a way as to reduce an assisting force as compared with during ordinary control and announce occurrence of an anomaly to the driver. Optionally, without carrying out processing 2 at anomaly determination, only occurrence of an anomaly may be announced to the driver by turn-on of warning lamp 8.

Figure 7:
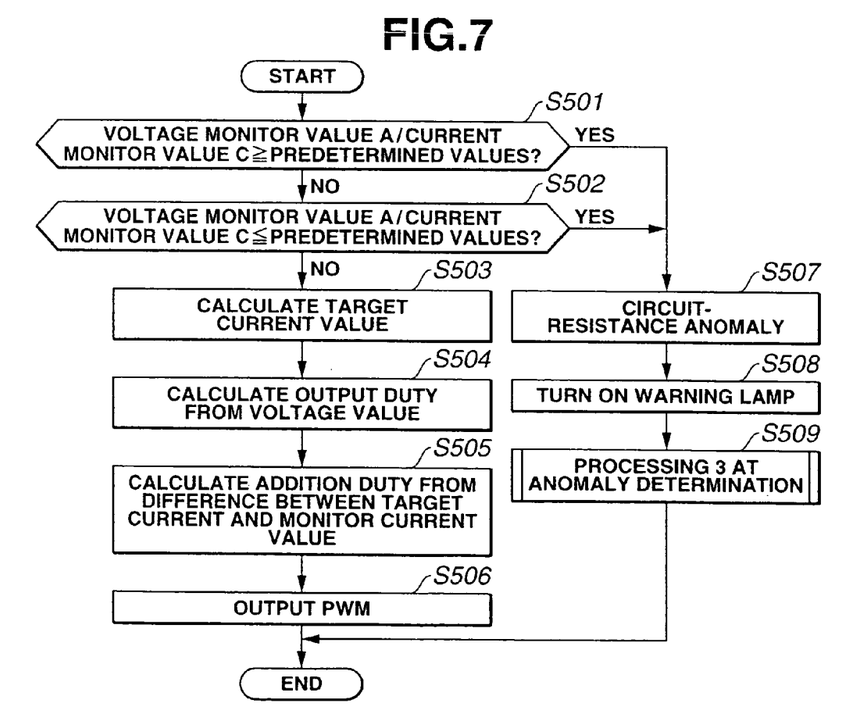
FIG. 7 is a chart similar to FIG. 6, showing operation of the first embodiment of the present invention.

Referring to FIG. 7, circuit-resistance anomaly determination processing and current feedback control processing will be described. At a step S501, it is determined whether or not a voltage monitor value A and a current monitor value C are equal to or greater than respective predetermined values. If voltage monitor value A/current monitor value C≧predetermined values, flow proceeds to a step S507, whereas voltage monitor value A/current monitor value C<predetermined values, flow proceeds to a step S502. That is, at step S501, it is determined whether or not a resistance value between voltage monitor circuit 120 and current monitor circuit 121 is equal to or greater than a predetermined value.

At step S502, it is determined whether or not voltage monitor value A and current monitor value C are smaller than or equal to respective predetermined values. If voltage monitor value A/current monitor value C≦predetermined values, flow proceeds to step S507, whereas voltage monitor value A/current monitor value C>predetermined values, flow proceeds to a step S503 where a target current value required to close solenoid valve 4 is calculated.

At a step S504, an output duty is calculated from voltage value detected by voltage monitor circuit 120. At a step S505, an addition or correction duty is calculated from a difference between target current value and current value detected by current monitor circuit 121. At a step S506, a PWM control signal is output from solenoid-valve drive circuit 116 to solenoid valve 4. By way of example, by setting the target current value at a constant value to carry out current feedback control so as to achieve the constant value, undesired opening of solenoid valve 4 can be prevented from occurring, resulting in achievement of stable steering assisting control.

At step S507, it is determined that an anomaly of a circuit resistance occurs. This is because if a resistance value obtained from voltage and current values monitored actually is not within a predetermined range, it can be determined that an anomaly of a circuit resistance occurs. At a step S508, warning lamp 8 is turned on to announce occurrence of an anomaly to the driver. And at a step S509, processing 3 at anomaly determination is carried out. Processing 3 at anomaly determination is processing to interrupt energization of solenoid valve 4 and electric motor 6a.

As described above, in the first embodiment, since current monitor circuit 121 is arranged between solenoid valve 4 and a ground, a current value passing though solenoid valve 4 can be detected, resulting in sure detection of the operating condition of solenoid valve 4.

Further, since current monitor circuit 121 is arranged to correct a supply voltage in such a way that a current passing through current monitor circuit 121 is equal to or greater than a predetermined value or a constant value, sufficient magnetic force of an electromagnet of solenoid valve 4 can be secured, resulting in prevention of occurrence of undesired opening or interruption of solenoid valve 4.

Still further, since voltage monitor circuit 120 is arranged, a power-supply fault can be detected wherein even though a voltage is not applied to solenoid valve 4, a current value is detected.

Figure 8:
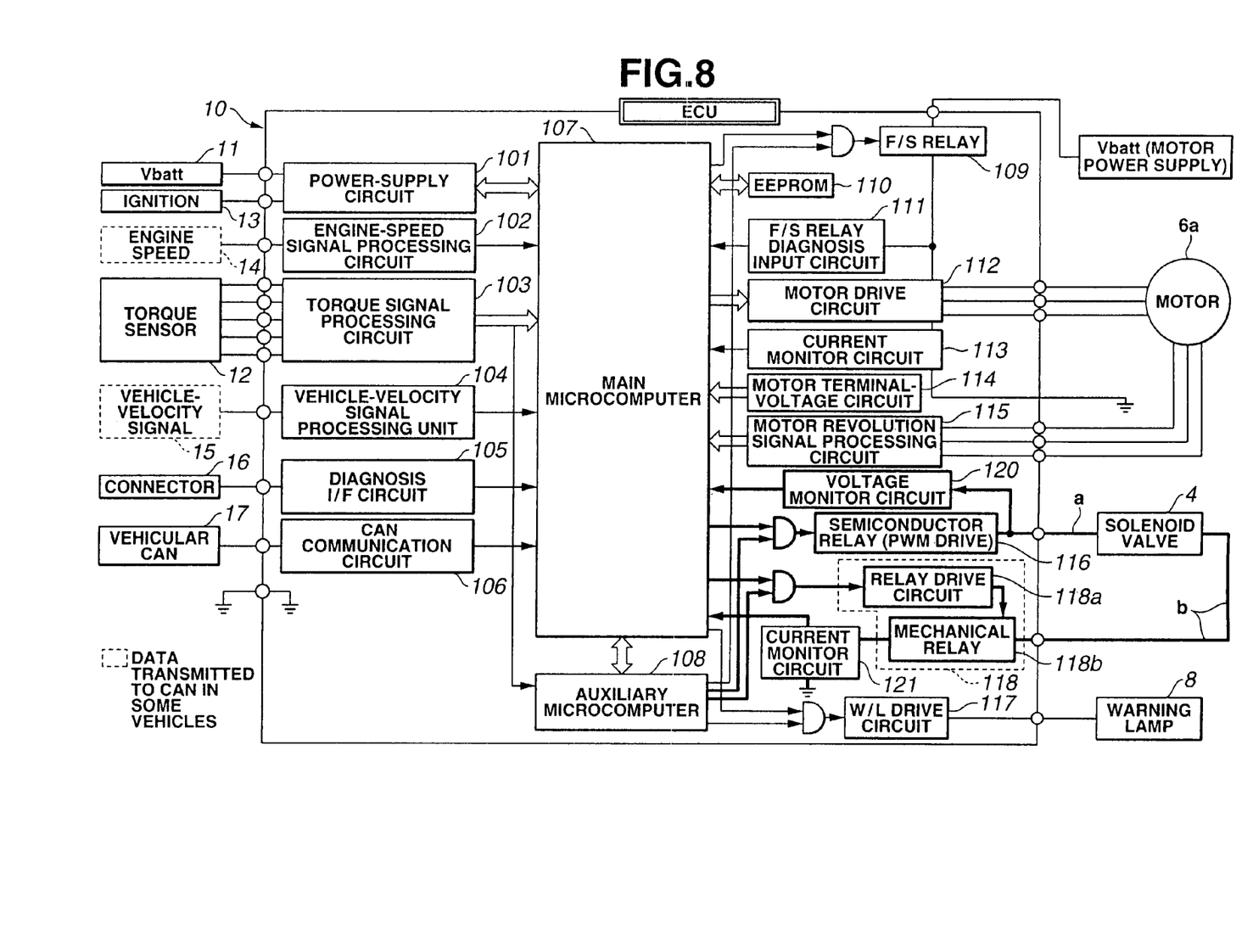
FIG. 8 is a diagram similar to FIG. 2, showing a second embodiment of the present invention.
Figure 9:
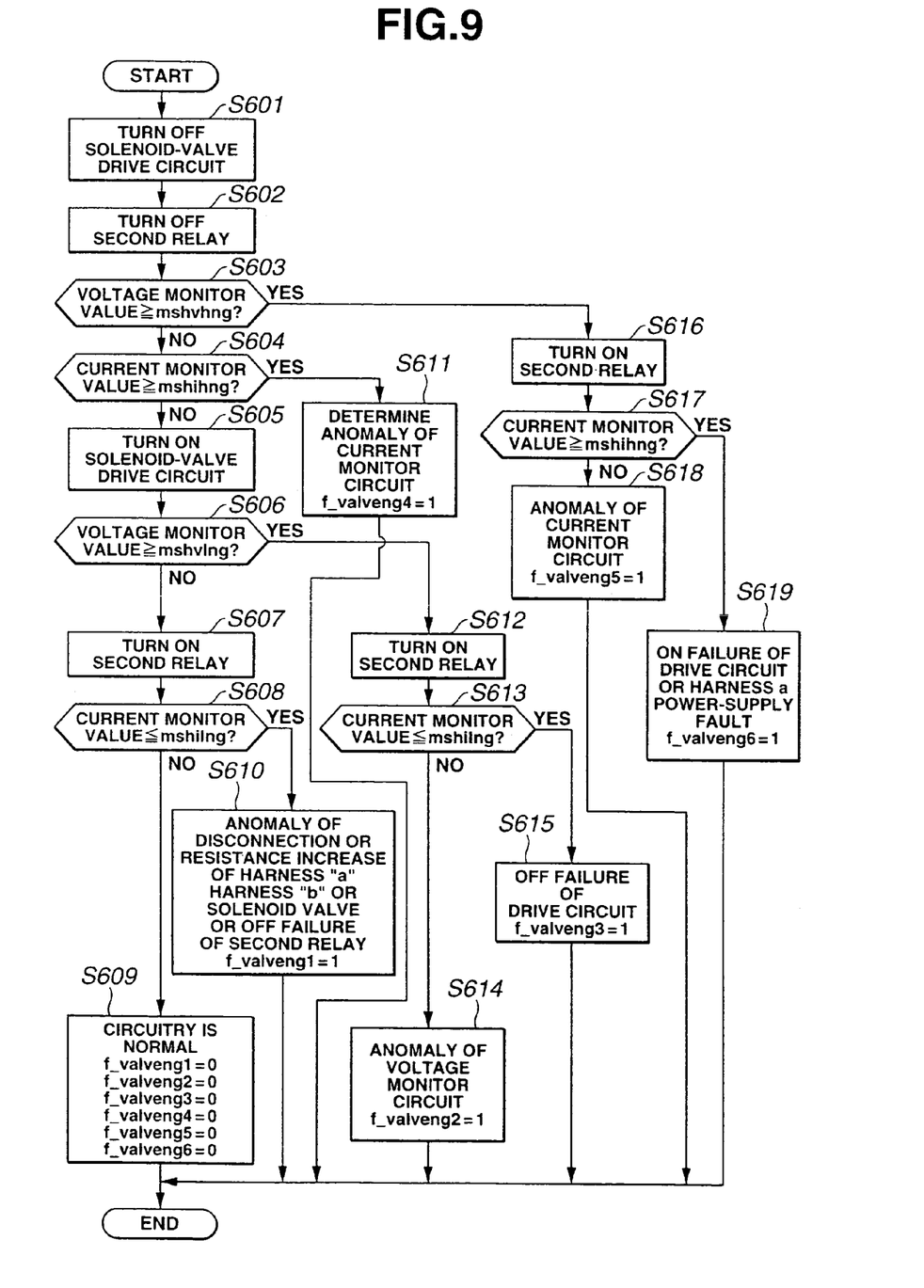
FIG. 9 is a chart similar to FIG. 7, showing operation of the second embodiment of the present invention.

Referring to FIGS. 8 and 9, there is shown second embodiment of the present invention which is substantially the same as the first embodiment except the points described below.

A second relay 118 is arranged between solenoid valve 4 and current monitor circuit 121. Second relay 118 comprises a relay drive circuit 118a and a mechanical relay 118b, and serves to switch a ground state of solenoid valve 4 in accordance with a command signal of main microcomputer 107 or auxiliary microcomputer 108. When mechanical relay 118b is turned on, solenoid valve 4 is driven by the supply of power, whereas when mechanical relay 118b is turned off, solenoid valve 4 is not driven regardless of the power supply condition. That is, even if a power-supply fault of the power-supply line occurs on the circuit for supplying power to solenoid 4, the supply of power to solenoid valve 4 is interrupted surely.

In the illustrative embodiment, second relay 118 comprises a mechanical relay. That is, since the mechanical relay is arranged which is different in structure from solenoid-valve drive circuit 116 in the form of a semiconductor relay, failures of the two relays resulting from the same cause can be prevented, leading to continuous operation of one of the relays. Particularly, excellent durability of the mechanical relay allows surer prevention of its failure. Optionally, in order to prevent failures of the two relays resulting from the same cause, second relay 118 may comprise a semiconductor relay having capacity different from that of solenoid-valve drive circuit 116.

The reason why the relays (solenoid-valve drive circuit 116 and second relay 118) are arranged upstream and downstream from solenoid valve 4 will be described. Referring to FIG. 8, since the power-supply circuit connected to fail-safe relay 109 and motor drive circuit 112 and the fail-safe valve control circuit such as solenoid-valve drive circuit 116 coexist on the circuit board, the presence of foreign material such as involvement of metal chip or bad soldering can cause bridging between the two circuits, leading to occurrence of a power-supply fault. Careful countermeasures against this potentiality are required, particularly, since the circuit board has an exposed metal surface.

Moreover, with the power steering unit, a power-supply harness and a solenoid-valve control harness are fundamentally bound together when mounted to the vehicle. Then, the power steering unit should be mounted at a site with very small space due to recent further size reduction of the vehicle. Although the two harnesses have low possibility of occurrence of a short circuit therebetween by virtue of their vinyl coatings, the two relays are arranged in view of potential short circuit.

Referring to FIG. 9, circuit-anomaly determination processing in the second embodiment will be described. At a step S601, solenoid-valve drive circuit 116 is turned off. At a step S602, second relay 118 is turned off. At a step S603, it is determined whether or not a voltage monitor value is equal to or greater than a predetermined value mshvhng. If voltage monitor value≧mshvhng, flow proceeds to a step S616, whereas if voltage monitor value<mshvhng, flow proceeds to a step S604. At step S604, it is determined whether or not a current monitor value is equal to or greater than a predetermined value mshihng. If current monitor value≧mshihng, flow proceeds to a step S611, whereas if current monitor value<mshihng, flow proceeds to a step S605.

At step S605, solenoid-valve drive circuit 116 is turned on. At a step S606, it is determined whether or not the voltage monitor value is equal to or greater than a predetermined value mshvhng. If voltage monitor value≧mshvhng, flow proceeds to a step S612, whereas if voltage monitor value<mshvhng, flow proceeds to a step S607 where second relay 118 is turned on. At a step S608, it is determined whether or not the current monitor value is equal to or smaller than a predetermined value mshilng. If current monitor value≦mshilng, flow proceeds to a step S610, whereas current monitor value>mshilng, flow proceeds to a step S609.

At step S609, it is determined that the circuitry is normal, and flags f_valveng1, f_valveng2, f_valveng3, f_valveng4, f_valveng5, f_valveng6 are set at 0. At step S610, it is determined that there occurs an anomaly of disconnection or resistance increase of energization circuit "a", energization circuit "b" or solenoid valve 4, or an off failure of second relay 118, and first flag f_valveng1 is set at 1. At step S611, it is determined that current monitor circuit 121 is abnormal, and first flag f_valveng1 is set at 1. At step S612, second relay 118 is turned on.

At a step S613, it is determined whether or not the current monitor value is equal to or smaller than a predetermined value mshilng. If current monitor value≦mshilng, flow proceeds to a step S615, whereas if current monitor value>mshilng, flow proceeds to a step S614. At step S614, it is determined that voltage monitor circuit 120 is abnormal, and second flag f_valveng2 is set at 1. At step S615, it is determined that there occurs an off failure of solenoid-valve drive circuit 116, and third flag f_valveng3 is set at 1.

At step S616, second relay 118 is turned on. At a step S617, it is determined whether or not the current monitor value is equal to or greater than predetermined value mshihng. If current monitor value≧mshihng, flow proceeds to a step S619, whereas current monitor value<mshihng, flow proceeds to a step S618. At step S618, it is determined that current monitor circuit 121 is abnormal, and fifth flag f_valveng5 is set at 1. And at step S619, it is determined that there occurs an on failure of solenoid-valve drive circuit 116 or a power-supply fault of energization circuit "a", and sixth flag f_valveng6 is set at 1.

The contents of the above control processing will be described in connection with the set conditions of the first to sixth flags.

When the Circuitry is Normal, i.e. All the First to Sixth Flags are Set at 0:

When the circuitry is normal, at steps S601, S602, solenoid-valve drive circuit 116 and second relay 118 are turned off. In this state, at steps S603, S604, voltage and current values are checked. If no voltage value nor current value is output, it can be confirmed, by turning off solenoid-valve drive circuit 116 and second relay 118, that power is surely interrupted.

Then, at step S605, solenoid-valve drive circuit 116 is turned on, and at step S606, the voltage value is checked once again. If the voltage value equal to or greater than predetermined value mshvlng is output, it can be determined that solenoid-valve drive circuit 116 operates normally. At step S607, second relay 118 is turned on, and at step S608, the current value is checked once again. If the current value greater than predetermined value mshilng is output, it can be determined that second relay 118 operates normally.

That is, by checking a voltage and current with solenoid-valve drive circuit 116 and second relay 118 turned off and also turned on, it can be checked the operating conditions of solenoid-valve drive circuit 116, energization circuit "a", energization circuit "b", second relay 118, voltage monitor circuit 120, and current monitor circuit 121.

When First Flag f_valveng1 is Set at 1:

At steps S601, S602, solenoid-valve drive circuit 116 and second relay 118 are turned off. In this state, at steps S603, S604, voltage and current values are checked. Since no voltage value nor current value is output, it can be confirmed, by turning off solenoid-valve drive circuit 116 and second relay 118, that power is surely interrupted.

Then, at step S605, solenoid-valve drive circuit 116 is turned on, and at step S606, the voltage value is checked once again. Since the voltage value equal to or greater than predetermined value mshvlng is output, it can be determined that solenoid-valve drive circuit 116 operates normally. At step S607, second relay 118 is turned on, and at step S608, the current value is checked once again. Since the current value smaller than or equal to predetermined value mshilng is output, flow proceeds to step S610 where it can be determined that there occurs an anomaly of disconnection or extraordinary resistance increase of energization circuit "a", energization circuit "b" or solenoid valve 4, or an off failure of second relay 118 wherein it stays in the off state. Then, first flag f_valveng1 is set at 1.

When Second Flag f_valveng2 is Set at 1:

At steps S601, S602, solenoid-valve drive circuit 116 and second relay 118 are turned off. In this state, at steps S603, S604, voltage and current values are checked. Since no voltage value nor current value is output, it can be confirmed, by turning off at least solenoid-valve drive circuit 116 and second relay 118, that power is surely interrupted.

Then, at step S605, solenoid-valve drive circuit 116 is turned on, and at step S606, the voltage value is checked once again. Since the voltage value smaller than predetermined value mshvlng is output, it can be determined that there occurs an off failure of solenoid-valve drive circuit 116 or an anomaly of voltage monitor circuit 120. At step S612, second relay 118 is turned on, and at step S613, the current value is checked once again. Since the current value equal to or greater than predetermined value mshilng is output, it can be determined that solenoid-valve drive circuit 116 is turned on, i.e. solenoid valve 4 is supplied with a current, and thus voltage monitor circuit 120 is abnormal. Then, second flag f_valveng2 is set at 1.

When Third Flag f_valveng3 is Set at 1:

The description is omitted, since fundamental flow (steps S601–S613) is the same as when second flag f_valveng2 is set at 1. At step S613, since the current monitor value is equal to or smaller than predetermined value mshilng, it can be determined that there occurs an off failure of solenoid-valve drive circuit 116. Then, third flag f_valveng3 is set at 1.

When Fourth Flag f_valveng4 is Set at 1:

At steps S601, S602, solenoid-valve drive circuit 116 and second relay 118 are turned off. In this state, at step S603, a voltage value is checked. Since no voltage value is output, it can be confirmed, by turning off at least solenoid-valve drive circuit 116, that power is surely interrupted.

Then, at step S604, a current value is checked. Since the current value greater than predetermined value mshihng is output, it can be determined that current monitor circuit 121 is abnormal. Then, fourth flag f_valveng4 is set at 1.

When Fifth Flag f_valveng5 is Set at 1:

At steps S601, S602, solenoid-valve drive circuit 116 and second relay 118 are turned off. In this state, at step S603, a voltage value is checked. Since the voltage value equal to or greater than predetermined value mshvhng is output, it is determined that there is a possible occurrence of an anomaly of voltage monitor circuit 120 or an on failure of solenoid-valve drive circuit 116, then flow proceeds to step S616.

At step S616, second relay 118 is turned on, and at step S617, a current value is checked. Since the current value is equal to or greater than predetermined value mshilng is output, it can be determined that voltage monitor circuit 120 is abnormal. Then, fifth flag f_valveng5 is set at 1.

When Sixth Flag f_valveng6 is Set at 1:

The description is omitted, since fundamental flow (steps S601–S617) is the same as when fifth flag f_valveng5 is set at 1. At step S617, since a current value is equal to or greater than predetermined value mshilng, it can be determined that solenoid valve 4 is supplied with a current, i.e. there occurs an on failure of solenoid-valve drive circuit 116 or a power-supply fault of energization circuit "a". Then, sixth flag f_valveng6 is set at 1.

As described above, in the second embodiment, in addition to the structure of the first embodiment, second relay 118 is arranged between solenoid valve 4 and current monitor circuit 121. With this, even if a power-supply fault of energization circuit "a" occurs, the supply of current to solenoid valve 4 can surely be interrupted.

Moreover, the use of voltage monitor circuit 120 and current monitor circuit 121 allows detection of an anomaly or failure of solenoid-valve drive circuit 116, voltage monitor circuit 120, energization circuit "a", energization circuit "b", second relay 118, and current monitor circuit 121. Thus, while surely carrying out failure detection, the variety of processing at anomaly determination can be secured by locating a failure part.

Figure 10:
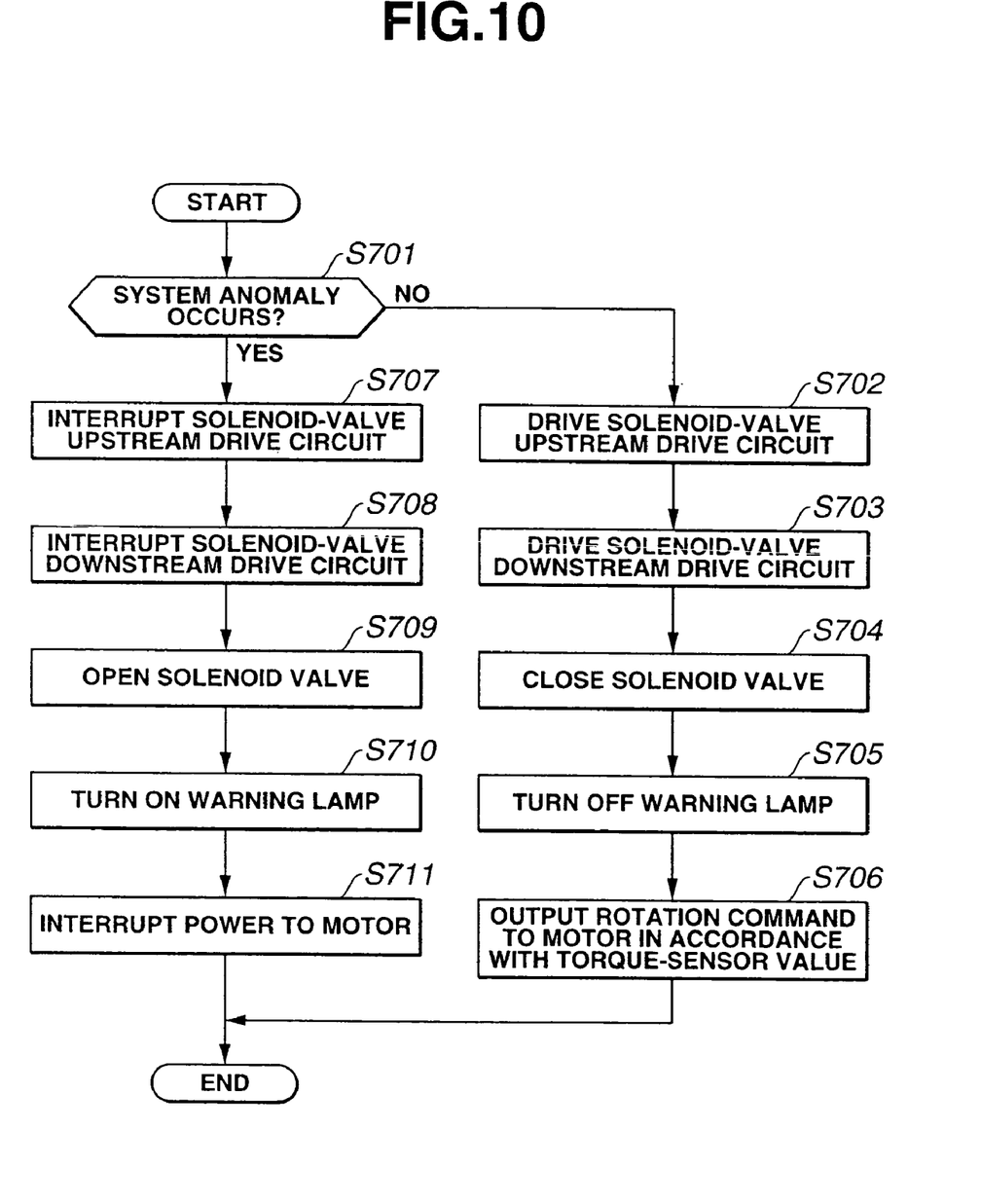
FIG. 10 is a chart similar to FIG. 9, showing a third embodiment of the present invention.

Referring to FIG. 10, there is shown third embodiment of the present invention which is substantially the same in structure as the second embodiment shown in FIG. 8. The third embodiment is involved in fail-safe control of the power steering system.

At a step S701, it is determined whether or not an anomaly occurs to the power steering system. If an anomaly occurs, flow proceeds to a step S707, whereas if no anomaly occurs, flow proceeds to a step S702.

At step S702, first relay 116 is driven, which serves as an upstream drive circuit of solenoid valve or fail-safe valve 4. At a step S703, second relay 118 is driven, which serves as a downstream drive circuit of solenoid valve 4. At a step S704, solenoid valve 4 is closed. At a step S705, when warning lamp 8 is turned on, a turn-off command is output thereto, whereas when it is turned off, the turn-off state is maintained. At a step S706, a rotation command is output to an electric motor 6a in accordance with a torque-sensor value.

At step S707, first relay 116 is interrupted. At a step S708, second relay 118 is interrupted. At a step S709, solenoid valve 4 is opened. At a step S710, a turn-on command is output to warning lamp 8. And at a step S711, power to electric motor 6a is interrupted.

As described above, in the third embodiment, first relay 116 is arranged on the power-supply line for solenoid valve 4 and between solenoid valve 4 and the power supply, and second relay 118 is arranged between solenoid valve 4 and a ground. With this, even if a power-supply fault occurs between first relay 116 and solenoid valve 4 to thereby cause impossible interruption of the supply of power by interrupting first relay 116, connection between solenoid valve 4 and a ground can be interrupted by second relay 118. Therefore, the supply of power to solenoid valve 4 can be interrupted surely, allowing the driver to carry out manual steering at occurrence of a failure of the power steering system.

As described above, according to the present invention, since the current monitor circuit is arranged between the solenoid valve and a ground, a current value passing through the solenoid valve can be detected, resulting in sure detection of the operating conditions of the solenoid valve.

Further, since the current monitor circuit is arranged to correct a supply voltage in such a way that a current passing through the current monitor circuit is equal to or greater than a predetermined value or a constant value, sufficient magnetic force of an electromagnet of the solenoid valve can be secured, resulting in prevention of occurrence of undesired opening or interruption of the solenoid valve.

Still further, since the voltage monitor circuit is arranged, a power-supply fault can be detected wherein even though a voltage is not applied to the solenoid valve, a current value is detected.

Furthermore, due to arrangement of the resistance calculation circuit, if a resistance value obtained from voltage and current values monitored actually is not within a predetermined range, it can be determined that an anomaly of a circuit resistance occurs.

Further, due to arrangement of the second relay, even if there occurs a power-supply fault of the energization circuit of the solenoid valve, the second relay can surely interrupt the energization circuit.

Still further, the solenoid valve includes a normally open valve which provides fluid communication therebetween when the valve fail to be energized. Thus, even if some anomaly occurs to the steering system to interrupt power, the first and second chambers can be in fluid communication, allowing the driver to carry out ordinary steering or manual steering with no assisting torque provided.

Still further, with a predetermined value of current supplied from the solenoid-valve drive circuit, when detecting a current value considerably smaller than the predetermined value, it can be determined that there occurs a disconnection of the energization circuit or a ground fault with resistance.

Still further, the motor control circuit, the solenoid-valve drive circuit, and the second relay are disposed on one side of the circuit board, and a power supply line is cabled to the one side of the circuit board. Thus, while reducing the structural size of the circuit board, the power supply line can be bundled easily, leading to enhancement in vehicle mountability thereof. Moreover, even if a power-supply fault occurs due to close arrangement of the power supply line of the electric motor and that of the solenoid valve, the solenoid-valve drive circuit and the second relay can surely interrupt supply of power to the solenoid valve.

Furthermore, the first relay is located between the solenoid valve and the power supply, and the second relay is located between the solenoid valve and a ground. Thus, even if a power-supply fault occurs between the first relay and the solenoid valve to thereby cause impossible interruption of the supply of power by interrupting the first relay, connection between the solenoid valve and a ground can be interrupted by the second relay. Therefore, the supply of power to the solenoid valve can be interrupted surely, allowing the driver to carry out manual steering at occurrence of a failure of the power steering system.

Further, since the first and second relays are different in structure or capacity, concurrent failures of the two relays resulting from the same cause can be prevented, achieving sure interruption of the supply of power to the solenoid valve.

Having described the present invention in connection with the illustrative embodiments, it is noted that the present invention is not limited thereto, and various changes and modifications can be made without departing from the scope of the present invention.

The entire teachings of Japanese Patent Application P2003-326702 filed Sep. 18, 2003 and Japanese Patent Application P2003-326703 filed Sep. 18, 2003 are hereby incorporated by reference.

What is claimed is:

1. A power steering system, comprising:
 a hydraulic power cylinder which assists a steering force of a steering mechanism coupled to a steering wheel;
 a reversible pump which supplies a hydraulic fluid to pressure chambers of the power cylinder through first and second passages;
 an electric motor which rotates the pump in first and second directions;
 an assisting-force detector which detects a steering assisting force to be provided to the steering wheel;
 a motor control circuit which outputs a drive signal to the motor in accordance with the detected steering assisting force so as to obtain a desired hydraulic pressure;
 a communication passage which provides fluid communication between the first and second passages;
 a solenoid valve which switches between communication and interruption of the communication passage; and
 a current detector which detects a current passing through an energization circuit of the solenoid valve and between the solenoid valve and a ground.

2. The power steering system as claimed in claim 1, further comprising a voltage correction circuit which corrects a voltage to be applied to the solenoid valve so as to have the detected current equal to or greater than a predetermined value.

3. The power steering system as claimed in claim 1, further comprising a voltage detector which detects a voltage applied on the energization circuit and between the solenoid valve and a power supply.

4. The power steering system as claimed in claim 3, further comprising a calculation circuit which calculates a resistance of the energization circuit from the detected current value and the detected voltage value,
 wherein when the calculated resistance fails to be within a predetermined range, it is determined that an anomaly of the energization circuit occurs.

5. The power steering system as claimed in claim 3, further comprising:
 a solenoid-valve drive circuit arranged between the solenoid valve and the power supply, the solenoid-valve drive circuit controlling a power-supply condition of the solenoid valve; and
 a relay arranged between the solenoid valve and the power supply, the second relay controlling a ground condition of the solenoid valve.

6. The power steering system as claimed in claim 1, wherein the solenoid valve includes a normally open valve which interrupts fluid communication between the first and second passages when the valve is energized, and provides fluid communication therebetween when the valve fail to be energized.

7. The power steering system as claimed in claim 1, wherein when the solenoid valve is supplied with a first current value and when the current detector detects a current value smaller than a second current value which is smaller than the first current value, it is determined that an anomaly occurs to the power steering system.

8. The power steering system as claimed in claim 5, further comprising:
 a circuit board having the motor control circuit, the solenoid-valve drive circuit, and the relay disposed thereon, wherein the motor control circuit, the solenoid-valve drive circuit, and the relay are disposed on a first side of the circuit board; and
 a power supply line cabled to the first side of the circuit board.

9. The power steering system as claimed in claim 1, further comprising first and second relays arranged on the energization circuit of the solenoid valve, the first relay being located between the solenoid valve and a power supply, the second relay being located between the solenoid valve and a ground.

10. The power steering system as claimed in claim 9, wherein the first and second relays are different in one of the structure and the capacity.

* * * * *